June 5, 1956  A. C. NOTTURNO  2,748,647
SECTIONAL QUICK RELEASE NUT AND RETAINER THEREFOR
Filed Aug. 12, 1952
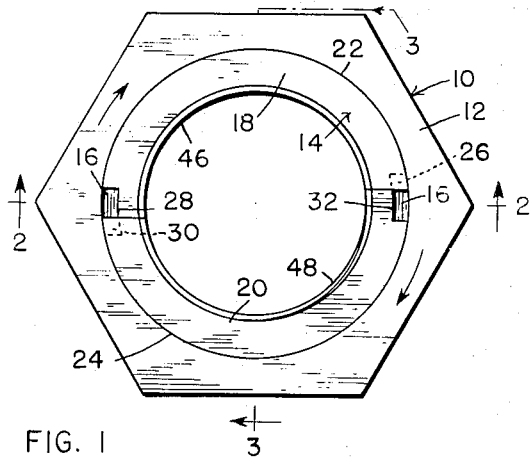
FIG. 1
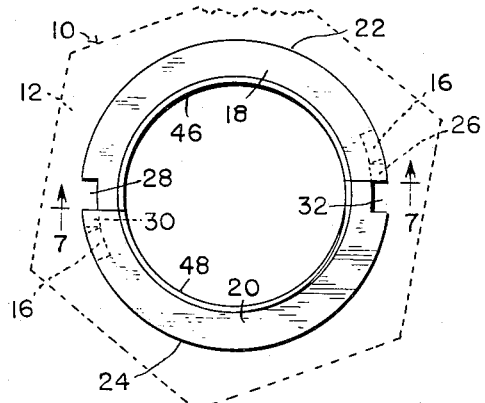
FIG. 5.
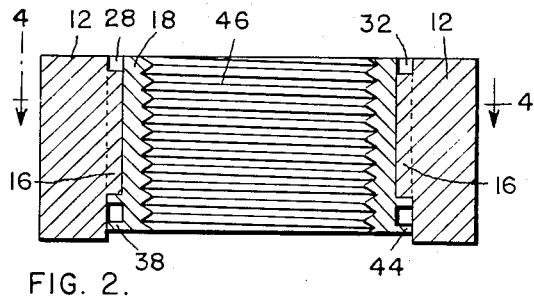
FIG. 2.
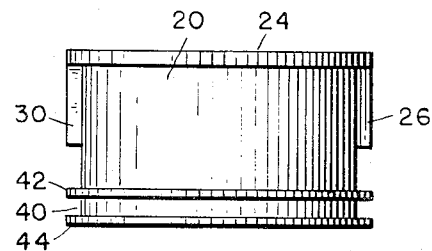
FIG. 6.
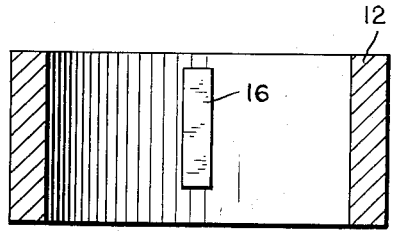
FIG. 3.
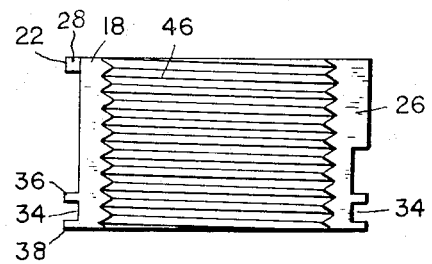
FIG. 7.
FIG. 4.
FIG. 8.
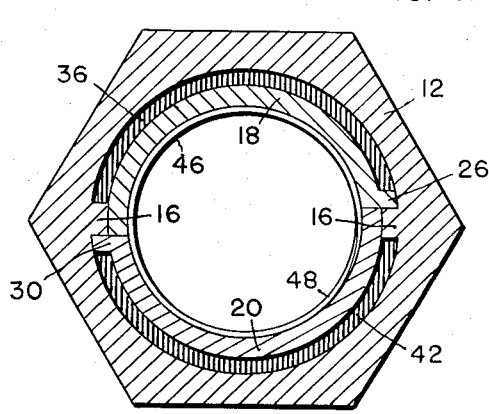
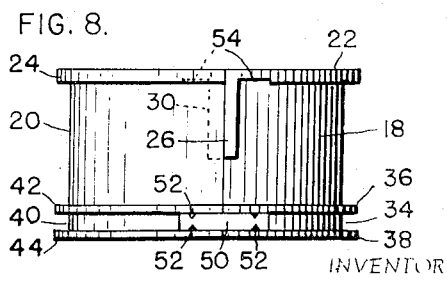
INVENTOR
ALBERT C. NOTTURNO
BY Gustave Miller
ATTORNEY

United States Patent Office 2,748,647
Patented June 5, 1956

2,748,647

SECTIONAL QUICK RELEASE NUT AND RETAINER THEREFOR

Albert Charles Notturno, Hewlett, N. Y.

Application August 12, 1952, Serial No. 303,967

3 Claims. (Cl. 85—33)

This invention relates to a sectional quick release nut and retainer therefor and particularly to a nut which is adapted to be released from a threaded bolt, stud or other device having a threaded stem, without the necessity of unscrewing the nut completely from the threaded member.

Heretofore, when a nut was to be applied to a threaded member, it was necessary to place the nut over one end of the member and screw it along the threaded member until it abutted against a stop means, where tightening was to begin. This required an unnecessary consumption of time and effort. Furthermore, when the threads on the stud, bolt or the like became damaged, it was often impossible to screw off the nut, thereby necessitating the use of a chisel, saw or the like to remove the nut from the threaded member.

In the use of this invention, no unnecessary time and effort is wasted in getting the nut to its tightening position, but instead, the nut can be clamped to the threaded member directly at the area where tightening begins. Also, if the threaded member is damaged, the nut can easily be unclamped and removed without any undue effort.

In addition, the nut of this invention is adapted to conform to all shapes and sizes of threaded members.

It is, therefore, one object of this invention to provide a nut which can be placed on a threaded member at any position along the length of that member.

Another object of this invention is to provide a nut which can be released from a threaded member of any size or shape.

Other objects of this invention are to provide an improved device of the character described, that is easily and economically produced, which is sturdy in construction and which is highly effective in operation.

With the above and related objects in view, this invention consists in the details of construction and combination of parts, as will be more fully understood from the following description, when read in conjunction with the accompanying drawing in which:

Fig. 1 is a top plan view of the assembled nut;

Fig. 2 is a cross-sectional view taken on line 2—2 of Fig. 1;

Fig. 3 is a cross-sectional view taken on line 3—3 of Fig. 1 showing only the outer core retaining member;

Fig. 4 is a transverse sectional view taken substantially on line 4—4 of Fig. 2;

Fig. 5 is a top plan view of the internal core the nut;

Fig. 6 is an outside elevational view of the internal core;

Fig. 7 is a view of one half of the internal core taken on line 7—7 of Fig. 5;

Fig. 8 is a side elevation of the internal core turned 90° from Fig. 6.

Referring now in greater detail to the drawing wherein similar reference characters refer to similar parts, there is shown a nut 10 comprising an outer core retainer member 12 and an internally threaded inner core member 14. The core retainer member 12 is shown here as polygonal in shape, but the shape of this core retainer member 12 is arbitrary, so that it may just as well be round, square, rectangular, etc., and it may also be smooth, knurled, grooved, etc. A pair of oppositely disposed key members 16 are integrally formed on the internal wall of the core retainer member 12, these keys extending to a position short of both the top and bottom of the core retainer member 12, as best shown in Fig. 3.

The inner core member 14 consists of two similar semi-cylindrical portions 18 and 20. A rim 22 extends around the top periphery of portion 18 and a similar rim 24 extends around the top periphery of portion 20. The rim 22 is formed with a vertical abutment 26 adjacent one edge and a recess 28 adjacent the other edge, while the rim 24 is formed with a similar vertical abutment 30 adjacent one edge and a recess 32 adjacent the other edge. A channel 34 is formed at the bottom of core portion 18 by flanges 36 and 38 and a complementary channel 40 is formed at the bottom of portion 20 by flanges 42 and 44. The internal walls of the two core portions are threaded as at 46 and 48, the two sets of threads being aligned to form a complete annular internal threaded portion.

The annular channel formed by channels 34 and 40 is adapted to receive therein a strip of spring metal 50. The spring 50 extends into both channels 34 and 40 and is connected to each of them by peening over a portion of each of the flanges forming the channels into recesses formed in the spring plate as at 52. The spring metal resiliently holds the core portions together but allows them to be moved apart under tension.

In assembling the nut on a stud, bolt or the like, the two core portions are placed around the stud or bolt and allowed to be drawn together by the spring 50. The core retainer member 12 is then brought down around the core so that the keys 16 fit into the recesses 28 and 32. The keys 16 are so constructed that they just fit between the rims 22 and 24 and the flanges 36 and 42 so that when the core retainer member 12 is rotated relative to the core, the keys are moved between the rims and the flanges until they abut against abutments 26 and 30, at which time further slippage of the core retainer member 12 relative to the core 14 is prevented, and further movement of the core retainer member 12 causes a tightening movement of the core member 14 to take place. Normally, the bottom of the core retainer member 12 extends slightly below the bottom of the core member 14 when it is applied to a bolt or stud, and reaches contact with the surface against which the nut is intended to secure. When the tightening movement of the nut has reached a certain point where natural resistance prevents further turning, the member 12 slips upward causing keys 16 to engage in shallow notches 54 formed in the rims, thereby providing a locking effect.

When the nut is to be removed from the stud or bolt, the member 12 is rotated in the opposite direction and after a few turns, the tension on member 12 is diminished sufficiently to allow the keys 16 to slip out of notches 54, thereby allowing the core retainer member 12 to turn relative to the core 14 until the keys 16 enter recesses 28 and 32. The core retainer member 12 can then be easily removed and the core portions 18 and 20 sprung away from each other to release them from the stud or bolt and allow them to be removed.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

1. A nut comprising an outer core retainer member adapted to be rotated by a suitable tool, an internally threaded inner core member comprising a plurality of partly cylindrical portions each having complementary internal threads, said outer core retainer member having a plurality of internal keys extending parallel to its longitudinal axis, each key stopping short of the top and bottom of the core retainer, each inner core portion having an externally flanged rim at one axial end thereof, an axially extending abutment depending from one end of said rim, a notch in said rim adjacent said abutment, a recess in the other end of said rim through which a core retainer key may pass to below the rim, and an externally projecting flange at the other axial end thereof, whereby said core portions may be placed about a threaded member and the core retainer may be placed about said core portions by passing said core retainer keys through said rim recesses, then rotating said core retainer to bring its keys into abutting relation with said abutment to then rotate the core portions on the threaded member and tighten the nut thereon, the core retainer extending axially at least slightly beyond the end of the last mentioned core member projecting flange whereby said core retainer first engages the workpiece to be fastened by the nut so that continued rotation of the nut on a threaded fastener results in the keys being drawn upwardly into interlocking engagement with the rim notches.

2. A nut as in claim 1 wherein said latter mentioned flanged rim has an annular channel, and a resilient connecting means comprising a leaf spring having its ends anchored in adjacent channel portions, separably connects said core portions together.

3. A nut comprising an outer core retainer member adapted to be rotated by a suitable tool, an internally threaded inner core member comprising two semi-cylindrical portions, each having complementary internal threads, said outer core retainer member having a pair of internal keys extending parallel to its longitudinal axis, each key being stopped short of the top and bottom of the core retainer, each inner core portion having an externally flanged rim at one axial end thereof, an axially extending abutment depending from one end of said rim, a notch in said rim adjacent said abutment, a recess in the other end of said rim through which a core retainer key may pass to below the rim, and an externally projecting flange at the other axial end thereof, whereby said two core portions may be placed about a threaded member and the core retainer may be placed about said two core portions by passing said core retainer keys through said rim recesses, then rotating said core retainer to bring its keys into abutting relation with said abutment to then rotate the core portions on the threaded member and tighten the nut thereon, the core retainer extending axially at least slightly beyond the end of the last mentioned core member projecting flange whereby said core retainer first engages the workpiece to be fastened by the nut so that continued rotation of the nut on a threaded fastener results in the keys being drawn upwardly into interlocking engagement with the rim notches.

References Cited in the file of this patent
UNITED STATES PATENTS

| | | |
|---|---|---|
| 1,062,000 | Hahn | May 20, 1913 |
| 1,360,297 | Jensen | Nov. 30, 1920 |
| 1,589,469 | Homand | June 26, 1926 |
| 1,915,588 | Arrington | June 27, 1933 |

FOREIGN PATENTS

| | | |
|---|---|---|
| 356,818 | France | Aug. 11, 1905 |